Fig. 12
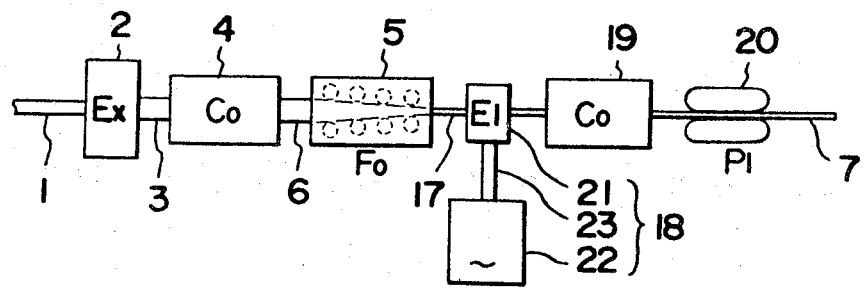
Fig. 13
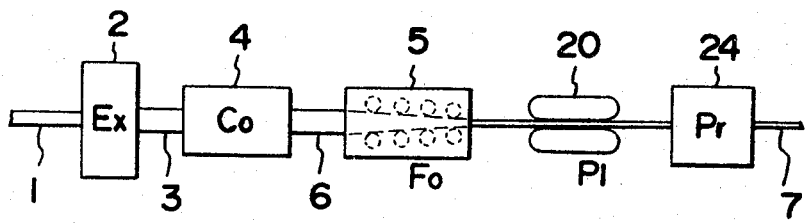
Fig. 14  Fig. 15  Fig. 16
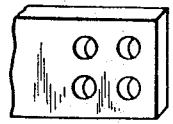  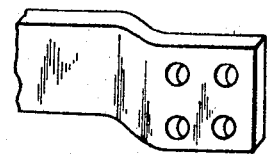

United States Patent Office 3,550,269
Patented Dec. 29, 1970

3,550,269
METHOD OF MANUFACTURING INSULATED BUS BAR
Hiroshi Yatabe and Takaji Takei, Yokohama, Keiji Oshima, Hiratsuka, Masatoshi Hikita, Shigeru Kanda, Yasuhiro Sato, and Takeshi Nkayama, Yokohama, and Tetsuya Nakata, Nagoya, Japan, assignors to The Furukawa Electric Company Limited, Tokyo, Japan
Filed Mar. 21, 1967, Ser. No. 624,802
Claims priority, application Japan, Mar. 26, 1966, 41/18,617; Aug. 10, 1966, 41/52,432; Sept. 26, 1966, 41/63,365; Nov. 9, 1966, 41/73,650; Feb. 17, 1967, 42/10,237; Feb. 18, 1967, 42/10,354
Int. Cl. H01b *19/00;* H05k *3/00*
U.S. Cl. 29—624                                    5 Claims

ABSTRACT OF THE DISCLOSURE

A method of manufacturing an insulated bus bar wherein at first an insulating material is applied around the outer periphery of a hollow cylindrical conductor and then the assembly is passed through a forming machine, thus compressing it into a flat form.

---

The present invention relates to a method of manufacturing an insulated bus bar from a hollow cylindrical conductor.

An object of the invention is to manufacture an insulated bus bar having excellent electrical and mechanical characteristics in a simple and easy manner.

Insulated bus bars have recently been used instead of bare bus bars for the sake of safety in operation and of improving reliability thereof.

It has been recognized that the insulated bus bar having a flat form in cross section and coated around the outer periphery thereof with an insulating material has excellent electrical and mechanical characteristics. Thus, various methods have been developed to obtain such insulated bus bar. However, it was difficult to manufacture an insulated bus bar having a flat form and covered around the outer periphery thereof with an insulating material.

Heretofore, it has been proopsed to manufacture an insulated bus bar wherein use is made of a die having a flat plate shaped opening and a conductor is extruded or drawn through this opening to form a flat plate shaped conductor and subsequently an insulating material is extruded and applied on the outer periphery thereof, thus forming the insulated bus bar. Such conventional method, however, requires an expensive press or draw bench and a number of dies having different dimensions, thus making the insulated bus bar expensive. Further disadvantages of the aforesaid known method of extruding and coating the insulating material on the conductor having a flat form are that machining of nipples and dies for the extruding machine becomes difficult, that the thickness of the insulating material extruded is liable to be non-uniform, and that the insulating material located at each side edge becomes weak, thus deteriorating the electrical and mechanical characeristics of the insulated bus bar.

Thus, it has heretofore been desired to develop a method of manufacturing an insulated bus bar having excellent electrical and mechanical characteristics in a simple and easy manner.

The invention is intended to obviate the above mentioned disadvantages.

The basic feature of the invention is to apply an insulating material around the outer periphery of a hollow cylindrical conductor and then compress the assembly into a flat form having gap therein, thereby forming an insulated bus bar. The subject matter of the invention is inclusive of improving practical problems inherent to the above basic feature of the invention.

It is an object of the invention to compress a hollow cylindrical conductor covered with an insulating material into a flat form, thus manufacturing an insulated bus bar having excellent electrical and mechanical characteristics in a simple and easy manner.

It is another object of the invention to compress a hollow cylindrical conductor covered with an insulating material into a flat form, in such a manner as will leave a very small gap therein, so as to manufacture the insulated bus bar with a small compressive force, without damaging its insulation, thus making it possible to reduce the capacity of the forming machine and increase the radius at edge portions as large as practicable.

It is a further object of the invention to compress a hollow cylindrical conductor covered with an insulating material after applying a metal, covering around the outer periphery of the insulating material, which act as also a shield, thus obviating damage and non-uniform thickness of the insulating material, which results in an insulated bus bar having excellent electrical and mechanical characteristics.

It is a still further object of the invention to compress a hollow cylindrical conductor, covered with an insulating material and preparatory enclosing another separate conductor therein into a flat form, thereby considerably increasing current carrying capacity in a simple and easy manner.

It is a still further object of the invention to compress a hollow cylindrical conductor covered with an insulating material into a flat form in such a manner that a space liable to form between the hollow conductor and the insulating material is prevented, thus facilitating dissipation of heat and preventing electrical breakdown due to occurrence of corona in the space even when the insulated bus bar is used under a high voltage.

It is a still further object of the invention to compress a hollow cylindrical conductor covered with an insulating material into flat form and subsequently cut the bus bar thus obtained into portions, each having a desired length, while, at the same time terminal machining operation at each end of the portions thus obtained, which results in shortening manufacturing steps and improving manufacturing efficiency.

For the purpose of attaining the above objects, the invention provides a method of manufacturing an insulated bus bar wherein a hollow cylindrical conductor is covered with an insulating material and subsequently the assembly is caused to pass through a forming machine where the assembly is compressed into a flat form having a very small gap remained therein.

The invention has features that in the above mentioned method of manufacturing an insulated bus bar a metal covering is applied on the outer periphery of the insulating material and that another separate conductor is enclosed in the hollow conductor.

Another feature of the invention is to add heating and cooling steps to the above mentioned methods of manufacturing an insulated bus bar and divide the insulated bus bar thus obtained into portions, each having a desired length, while, at the same time, effecting a terminal machining operation at each end of the divided portions, all steps being carried out by one continuous process.

Other objects will appear in the following specification, reference being made to the drawings in which;

FIG. 12 is a diagrammatic illustration of a method of manufacturing an insulated bus bar wherein heating and cooling steps are added to the process shown in FIG. 2;

FIG. 13 is a diagrammatic illustration of a method of manufacturing an insulated bus bar wherein a step of effecting a terminal machining operation is added to the process shown in FIG. 2; and FIGS. 14, 15 and 16 are perspective views showing terminal portions of insulated bus bar manufactured by a method according to the invention.

Figure 1:
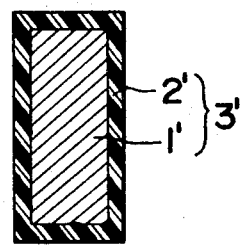
FIG. 1 is a sectional view of an insulated bus bar manufactured by the conventional method.

Referring first to FIG. 1, there is shown the cross-section of an insulated bus bar 3' manufactured by the conventional method wherein use is made of a die having a flat plate shaped opening and a conductor is extruded or drawn through this opening to form a flat plate-shaped conductor 1' and subsequently an insulating material 2' is applied by wrapping or extrusion, on the outer periphery thereof, thus forming the insulated bus bar 3'.

Figure 2:
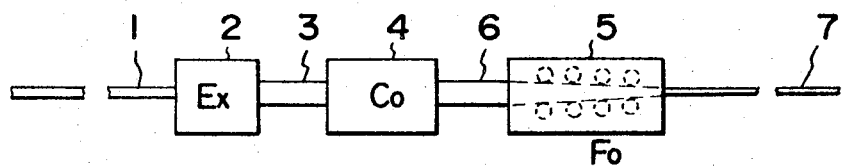
FIG. 2 is a diagrammatic illustration of a method of manufacturing an insulated bus bar according to the invention.

FIG. 2 diagrammatically illustrates a method of manufacturing an insulated bus bar according to the invention. In the drawing, 1 designates a hollow cylindrical conductor made of copper or aluminium; 2, an extruding machine; 3, an insulating material made of, for example, rubber or plastic material such as polyethylene, vinyl chloride, etc., and applied in a given thickness on the outer periphery of the hollow cylindrical conductor 1; 4, a cooling tank; and 5, a forming machine such as, for example, two stage rolls arranged in series. Use may be made as the forming machine 5 of a press instead of the two stage rolls.

Figures 3, 4:
FIG. 3 is a sectional view of an insulated bus bar manufactured by a method according to the invention.
FIG. 4 is a sectional view of another insulated bus bar manufactured by a method according to the invention.

The hollow cylindrical conductor 1 is passed through the extruding machine 2, thus covering the outer periphery thereof with the insulating material 3 in a given thickness of, for example, 2 to 3 mm. The insulating material 3 is then cooled by water at the cooling tank 4 and the hollow cylindrical bus bar 6 thus cooled is passed through the forming machine 5 and compressed into an insulated bus bar 7 having a flat form. In this case the flat conductor 8 thus compressed is provided therein with a very small flat gap as shown in FIG. 3.

This makes it possible to reduce the capacity of the forming machine, prevent the insulation at the edge portion from being so deformed as to be harmful to the manufacture of the bus bar, and increase the radius of the edge portion to such an extent as will not hamper its practical use, thus improving its electrical properties. By this means it is possible to obtain further advantage to decrease the skin effect of the conductor.

As the starting hollow cylindrical conductor, use may be made of a conductor which is circular or elliptical in cross-section and has such thickness and diameter as will, when compressed, ensure a desired shape and thickness. The outer diameter of the hollow cylindrical conductor 1 may be made 30 mm., 50 mm., 70 mm., 110 mm., etc., and the thickness may be made in the order of 3 mm.

Figure 5:
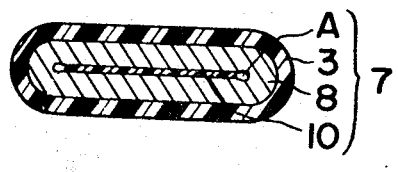
FIG. 5 is a sectional view of a modified insulated bus bar manufactured by a method according to the invention and enclosing an insulating tape therein.

If it is desired to make very small gap A in the insulated bus bar 7, deformation of the hollow cylindrical conductor 1 caused by the forming rolls of the forming machine 5 is limited to such an extent that the very small flat gap A remains in the insulated bus bar 7. Alternatively, the hollow cylindrical conductor 1 may be provided on the inner wall surface thereof with a peeling agent 9 as shown in FIG. 4 or with an insulating tape 10 made of paper or plastic preparatory inserted in the very small gap A as shown in FIG. 5, and subsequently the insulating material 3 may be applied around the outer periphery of the conductor 1 and then the peeling agent 9 or the insulating tape 10 may be applied on or inserted into the very small gap A.

FIG. 4 shows the cross-section of an insulated bus bar 7 wherein center portions of the upper and lower inner wall surfaces of the conductor 8 are closely engaged together with the peeling agent 9 applied therebetween. FIG. 5 shows the cross-section of an insulated bus bar 7 enclosing the insulating tape 10 in the very small gap A. The presence of the peeling agent 9 or the insulating tape 10 in the flat conductor 8 makes it possible to easily separate the upper and lower inner wall surfaces in the lengthwise direction thereof in case of connecting the insulated bus bars with one another. In the above mentioned embodiment, the insulating material is applied on the hollow cylindrical conductor with the aid of the extruding machine and then the assembly is compressed into a flat form.

The invention, however, is not limited to this embodiment, but covers such case where the insulating tape made of for example, rubber or plastic, etc., is wound around the hollow cylindrical conductor to form an insulating covering having a given thickness and then the assembly is compressed into a flat form.

The above mentioned method of manufacturing the insulated bus bar wherein the hollow cylindrical conductor is covered on the outer periphery thereof with the insulating material and the assembly is compressed into the flat form having a very small flat gap therein has advantages that the manufacture can easily be effected because the conductor can be compressed by a small force without giving a high mechanical deformation to the insulation, rendering it possible to reduce the size of the forming machine, that the insulating material can be applied uniformly on the hollow cylindrical surface of the conductor in a simple manner, that since the hollow cylindrical conductor thus insulated is compressed into a flat form, the insulating material sustains no such damage as often occurs in the conventional process in which the insulating material is applied on the flat conductor, thus improving the electrical and mechanical characteristics of the insulated bus bar, and that because of the presence of slit in the flat conductor, the ends of the bus bar can easily be separated in the lengthwise direction, thus making it easy to coaxially overlap and connect the bus bars one upon the other. Moreover, because of the fact that the skin effect caused by the alternating current flow is small and thence increase of the effective resistance is small, the current capacity can be increased as compared with the flat conductor having the same cross-sectional area.

As above mentioned, when the hollow cylindrical conductor is covered with the insulating material and then the assembly is passed through the forming machine, the compressive force is directly applied to the insulating material. Thus, the forming rolls or the compressive dies of the forming machine are brought into a direct contact with the insulating material which may result in damage to non-uniform thickness of the insulating material, thereby deteriorating the electrical characteristics of the insulated bus bar.

Figure 6:
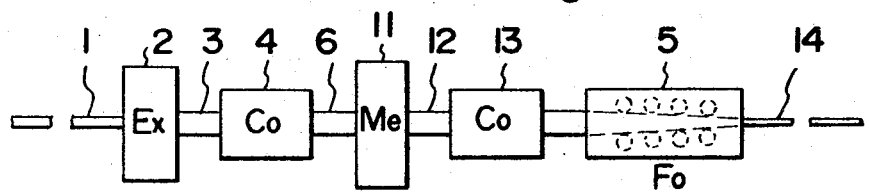
FIG. 6 is a diagrammatic illustration of a method of manufacturing an insulated bus bar according to the invention wherein a step of applying a metal covering around the outer periphery of the insulating material is included.

In order to obviate such disadvantage, it is preferable to carry out the method according to the invention in such a manner that the hollow cylindrical conductor is covered on the outer periphery thereof with the insulating material and then with a metal covering, and that the assembly is passed through the forming machine, thus compressing it into a flat form having a very small gap in the conductor. This embodiment is shown in FIG. 6.

In this embodiment, provision is made of a metal covering machine 11 and a cooling tank 13 arranged successively between the cooling tank 4 and the forming machine 5. The metal covering machine 11 serves to cover the outer periphery of the insulating material 3 with a metal covering 12 made of lead, aluminum, etc. and having a desired thickness, for example, of the order of 2 mm. The assembly is cooled by the cooling tank 13 and subsequently is compressed into a flat insulated bus bar 14 having a very small gap A in the conductor 8.

In the above mentioned embodiment, the insulating material 3 is applied on the hollow cylindrical conductor with the aid of the extruding machine and then the metal layer 12 is applied on the insulating material, and subsequently the assembly is compressed into a flat form. The invention, however, is not limited to this embodiment, but covers such case in which the insulating tape is wound around the hollow cylindrical conductor in a given thickness and then the metal tape is wound around the insulating tape, and subsequently the assembly is compressed into a flat form in cross-section.

Figure 7:
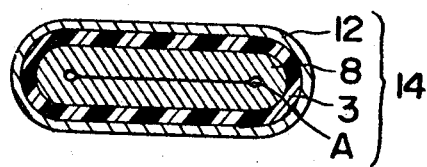
FIG. 7 is a sectional view of an insulated bus bar manufactured by a method according to the invention and provided around the outer periphery thereof with a metal covering.

Application of metal covering to the insulated hollow cylindrical conductor prevents any damage to non-uniform thickness of the insulation and provides excellent electrical and mechanical characteristics. FIG. 7 shows the insulated bus bar manufactured as above described.

If it is desired to increase the current carrying capacity of the insulated bus bar, provisions are required hollow cylindrical conductors having different sizes and many kinds of nipples and dies for the extruding machine, thus rendering the method uneconomical.

In order to obviate such disadvantage, it is preferably to carry out the method according to the invention in such a manner that the insulated hollow cylindrical conductor enclosing another separate conductor is passed through the forming machine and compressed it into a flat form in cross-section. This embodiment is capable of increasing the cross-sectional area of the conductor and hence increasing the current carrying capacity without changing the size of the hollow cylindrical conductor.

Figure 8:
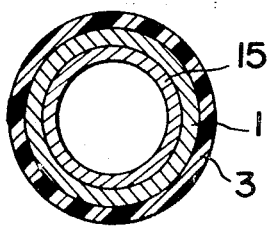
FIG. 8 is a sectional view of an insulated hollow cylindrical bus bar enclosing another separate conductor therein.
Figure 9:
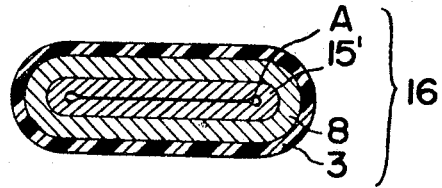
FIG. 9 is a sectional view of an insulated bus bar manufactured by compressing the hollow cylindrical conductor shown in FIG. 8 into a flat form.
Figure 10:
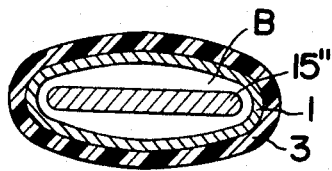
FIG. 10 is a sectional view of a modified insulated bus bar manufactured by compressing the hollow cylindrical conductor shown in FIG. 8.

In this embodiment, a cylindrical conductor 15 made of, for example, copper or aluminum which is the same material as that of the hollow cylindrical conductor 1 is coaxially fitted in the latter and the whole is passed successively through the extruding machine 2 and the cooling tank 4 cover the hollow cylindrical conductor 1 with the insulating material 3 as shown in FIG. 8. Then, the assembly is compressed into a flat insulated bus bar 16 having a very small gap A in the flat conductor 15'. It may, of course, be possible to apply the insulating material around the outer periphery of the hollow cylindrical conductor 1 and then fit coaxially another separate cylindrical conductor 15 in the conductor 1 and subsequently make the assembly pass through the forming machine 5. FIG. 9 shows a flat insulated bus bar 16 manufactured as above described. In the present embodiment, the cylindrical conductor 15 is fit coaxially into the hollow cylindrical conductor 1 and the assembly is compressed into a flat form having a very small gap A in the inner conductor 15. The invention is not limited to such embodiment, but covers such case in which compress the hollow cylindrical conductor 1 covered with the insulating material 3 is compressed into an elliptical form having a space B in the conductor 1 and then a plate-shaped conductor 15″ is inserted into the space B as shown in FIG. 10, and subsequently the assembly is compressed into a flat form. The plate-shaped conductor 15″ may be inserted into the hollow cylindrical conductor 1 before or after the insulating material 3 is applied around the outer periphery of the hollow cylindrical conductor 1.

The above mentioned embodiment of the manufacturing of the insulated bus bar, wherein the insulated hollow cylindrical conductor enclosing another separate conductor inserted therein is compressed into a flat form, has advantages that it greatly increases the sectional area of the conductor and that the insulated bus bar having increased current capacity can be manufactured from hollow cylindrical conductor of a specific size without using conductors of change different sizes, with the aid of one kind of nipples and dies for the extruding machine, thus reducing the manufacturing cost.

Figure 11:
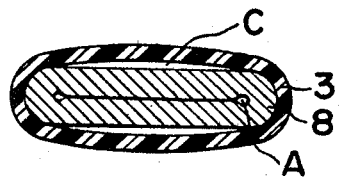
FIG. 11 is a sectional view of an insulated bus bar manufactured by a method according to the invention, having between the conductor and the insulating material with a space.

If the hollow cylindrical conductor covered with the insulating material is compressed into a flat form, having a very small gap therein, it is liable to produce a space C between the conductor and the insulating material as shown in FIG. 11.

In order to obviate such disadvantage, it is preferable to carry out the method according to the invention in such a manner that the hollow cylindrical conductor is covered on the outer periphery thereof with the insulating material and then the assembly is passed through the forming machine, compressed it into a flat form having a very small gap in the conductor, and subsequently subjected to heating and cooling processes.

This embodiment is shown in FIG. 12 in which the hollow cylindrical conductor 1 covered with the insulating material 3 is compressed into a flat form having a very small gap A therein in the same manner as explained with reference to FIG. 2. The flat bus bar 17 thus obtained is passed through a high frequency heating device 18 thus heating the insulating material 3 of the flat bar 17, cooled in a cooling device 19, and finally taken up by means of a pulling device 20, thereby obtaining an insulated bus bar 7.

The high frequency heating device 18 comprises an electrode 21, a high frequency supply source 22, and a supply conductor 23 for connecting the electrode 21 to the high frequency supply source 22. The electrode 21 comprises a pair of parallel plate-shaped electrodes adapted to be brought into contact with the upper and lower surfaces of the flat bar 17 and heat the insulating material 3. A high frequency voltage is supplied from the high frequency supply source 22 through the supply conductor 23 to the electrode 21, thus inductively heating the insulating material 3 by means of the high frequency current.

The temperature for softening the insulating material 3 varies more or less according to the kind of the insulating material 3 and is 120° C. to 180° C. for plastic, for example. It is preferable to use a heating temperature of the order of 150° C. for vinyl chloride as the insulating material 3.

The insulating material 3 heated by the high frequency heating device 18 passed through the cooling device 19 where the insulating material 3 is cooled by water or air. During the high frequency heating of the insulating material 3, the conductor 8 is hardly heated so that during the cooling of the flat bar 17, the insulating material 3 suddenly contracts and comes automatically into the conductor 8. Moreover, since the insulating material 3 becomes softened by heating, a strain caused to the insulating material 3 during the extrusion process can be removed. The operating conditions of the high frequency heating device 18 are dependent upon the speed for manufacturing the insulated bus bar 7 and the property and thickness of the insulating material 3.

It is preferable to use the frequency of the order of 40 mc./sec. for the high frequency heating device 18.

The method of heating the insulating material 3 is not limited to the high frequency heating device, but any other heating devices such as, for example, an electric furnace may also be used.

Provision may be made of pressure rolls at any proper place in the cooling device 19 if the insulating material 3 could not be brought into contact with the conductor 8 due to incomplete contraction of the insulating material 3 during the cooling of the flat bar 17 after it has been heated by means of the high frequency heating means, electric heating means, etc.

The above mentioned embodiment of the invention, wherein the hollow cylindrical conductor is covered on the outer periphery thereof with the insulating material and then the assembly is passed through the forming machine thus compressing it into a flat form having a very small gap therein, and subsequently heated and cooled, has advantages that the space formed between the conductor and the insulating material is removed to produce an insulated bus bar having the conductor closely in contact with the insulating material.

The insulated bus bar thus produced has advantages that heat can efficiently be dissipated, that occurrence of corona in the space can be prevented, that a season crack liable to develop in case of using vinyl chloride as the insulating material can also be prevented, thus improving the electrical and mechanical characteristics of the insulated bus bar, and that the uniform thickness of the bus bar can accurately and easily be obtained.

If it is desired to divide the insulated bus bar manufactured as above mentioned into portions, each having a length of 3 to 5 m., and also effect terminal machining operation for each of the divided portions of the bus bar, the manufacture of the bus bar and the terminal machining operation become difficult and take a long time, thus decreasing the manufacturing efficiency. In order to obviate such disadvantage, it is preferable to carry out the method according to the invention in such a manner that the hollow cylindrical conductor is covered around the outer periphery thereof with the insulating material and the assembly is passed through the forming machine and compressed into a flat form having a very small gap therein and that subsequently the flat bar thus obtained is divided into portions, each having a desired length, while at the same time the terminal machining operation is effected. This embodiment is shown in FIG. 13 in which the hollow cylindrical conductor 1 covered with the insulating material 3 is compressed into a flat form having a very small gap therein to produce the insulated bus bar 7 and subsequently the insulated bus bar 7 is divided into portions, each having a desired length, by means of a press cutting machine 24, which is capable of effecting simultaneously the terminal machining operations such as punching holes in the terminal end and bending machining operation, etc.

For this purpose the press cutting machine 24 is provided, near the cutting blades, with a punching tool for punching holes and a bending tool for effecting the bending machining operation.

Since the flat conductor 8 of the insulated bus bar 7 is made of nonferrous metal having an excellent conductivity such as copper or aluminum, the workability thereof is very good. This fact makes it possible to effect the terminal machining operation for the flat insulated bus bar having different thickness without using a powerful press cutting machine 24, punching tool and bending tool and make the life of these machines and tools long, thus making the method more economical.

If the number of holes to be punched at the terminal portion, the distance between these holes and the degree of bending the terminal portion are different, a number of punching tools and bending tools are provided beforehand so that selection and replacement thereof can freely be effected. The punching tool and the bending tool comprise a combination of dies and punches. The punches are secured to the upwardly and downwardly movable cutting blade by means of a clamping member and the dies are secured to the stationary bed by means of a clamping member.

FIGS. 14, 15 and 16 show end portions of the insulated bus bar where the terminal machining operation is effected.

The invention is not limited to such terminal machining operation, but various types of terminal machining operations can be applied to the end portions of the insulated bus bar by means of punching tools, bending tools, etc., having constructions and dimensions adapted to the object of the invention. In practice, the insulating material on the end portion of the insulated bus bar may be removed and the naked flat conductors may be connected to one another.

The above mentioned embodiment of the invention, wherein the hollow cylindrical conductor covered on the outer periphery thereof with the insulating material is compressed into a flat form having a very small gap remained therein and subsequently the bus bar thus obtained is divided into portions, each having a desired length, while at the same time the terminal machining operation is effected, has advantages that the insulated bus bar is not required to be transported to the terminal machining plant, thus speeding up the manufacturing steps, and that automation process for manufacturing the insulated bus bar can easily be applied, thus improving the manufacturing efficiency and decreasing the manufacturing costs.

What we claim is:

1. A method of manufacturing an insulated bus bar comprising the steps of: extruding a coating of heated thermoplastic, heat shrinkable, insulating resin on the outer periphery of a tubular conductor, solidifying said insulating resin by cooling same; flattening plastically the tubular conductor and the solidified resin by applying compressive force on the outer resin surface until the internal periphery of said conductor defines a gap bounded by two substantially straight and parallel conductor surfaces terminating in an arc at each end; and shrinking the flattened resin to tightly hug the plastically flattened conductor by heating and cooling the conductor and the shrunk resin to provide said bus bar.

2. A method of manufacturing an insulated bus bar as sets forth in claim 1, wherein said insulating resin is polyethylene.

3. A method of manufacturing an insulated bus bar as set forth in claim 1, wherein said insulating resin is polyvinylchloride.

4. A method of manufacturing an insulated bus bar as set forth in claim 1, wherein the heat shrinking of said insulating resin is carried out by high frequency induction heating.

5. A method of manufacturing an insulated bus bar as set forth in claim 1, wherein the heat shrinking of said insulating resin is carried out by electric heating.

References Cited

UNITED STATES PATENTS

| | | | |
|---|---|---|---|
| 1,209,096 | 12/1916 | Williamson | 29—456X |
| 3,136,676 | 6/1964 | Fisch | 29—528 |
| 3,334,503 | 8/1967 | Ingber | 72—47 |
| 717,778 | 1/1903 | Spaulding | 174—117.11 |
| 1,957,212 | 5/1934 | Hinsky | 18—13K |
| 2,994,058 | 7/1961 | Dahlgren | 174—117X |
| 3,076,262 | 2/1963 | Rappleyea et al. | 29—517 |
| 3,182,381 | 5/1965 | Johnston et al. | 29—624 |
| 3,235,954 | 2/1966 | Fromson | 29—474.1 |
| 3,312,773 | 4/1967 | Lit | 29—624X |

JOHN F. CAMPBELL, Primary Examiner

R. W. CHURCH, Assistant Examiner

U.S. Cl. X.R.

18—13; 29—447, 460, 516; 72—47; 174—99, 129, 133; 339—22